United States Patent [19]

Wood

[11] Patent Number: 4,529,744
[45] Date of Patent: Jul. 16, 1985

[54] COMPATIBILIZED AROMATIC POLYESTER POLYOLS

[75] Inventor: Robert J. Wood, Round Lake Park, Ill.

[73] Assignee: Stepan Company, Northfield, Ill.

[21] Appl. No.: 622,670

[22] Filed: Jun. 20, 1984

Related U.S. Application Data

[63] Continuation-in-part of Ser. No. 436,551, Oct. 25, 1982, abandoned.

[51] Int. Cl.$^3$ ............................................. C08G 18/14
[52] U.S. Cl. ................................... 521/131; 252/182; 252/357; 521/167
[58] Field of Search ............... 521/131, 167; 252/182, 252/357

[56] References Cited

U.S. PATENT DOCUMENTS

| | | | |
|---|---|---|---|
| 3,078,315 | 2/1963 | Steele et al. | 568/625 |
| 3,362,979 | 1/1968 | Bentley | 260/453 R |
| 3,745,133 | 7/1973 | Comunale et al. | 521/156 |
| 4,246,364 | 1/1981 | Koehler et al. | 521/167 |
| 4,313,847 | 2/1982 | Chasin et al. | 252/356 |

OTHER PUBLICATIONS

Hughes, J. M. & Clinton, J. L. "Development Of Lower Cost Polyurethane Modified Polyisocyanate And Polyurethane Rigid Foams" paper given at (SPI 25 Annual Urethane Surtech Conference, 10/29/79).

Primary Examiner—Maurice J. Welsh
Attorney, Agent, or Firm—Hill, Van Santen, Steadman & Simpson

[57] ABSTRACT

Compatibility agents and polyol blend compositions are provided containing nonionic block ethoxylate propoxylate compounds, amine and amide diol compounds, and aromatic ester polyols, especially phthalate polyester polyols, which blends are miscible with fluorocarbon blowing agents. These blends are suitable for reaction with polyfunctional organic isocyanates in the presence of trimerization catalyst to make cellular polyisocyanurates.

17 Claims, No Drawings

COMPATIBILIZED AROMATIC POLYESTER POLYOLS

RELATED APPLICATION

This application is a continuation-in-part of my earlier filed U.S. patent application Ser. No. 436,551 filed Oct. 25, 1982 and now abandoned.

BACKGROUND OF THE INVENTION

1. Field of the Invention

This invention relates to cellular polyisocyanurates and intermediates therefor and especially to novel compatibilized homogeneous polyol (including diols) blends, and to their usage in a process for the making of such cellular products.

2. Description of the Prior Art

Cellular polyisocyanurates are well known in the art for use in thermal insulating applications and for their heat and flame resistance. Polyols are commonly added to the foam-forming composition (commonly called a resin blend or resin premix) to modify foam properties. When a fluorocarbon blowing agent is employed in the foam-forming composition, a problem in compatibility between the polyol (especially aromatic polyester polyols) and such fluorocarbon may arise in resin premixes.

As those skilled in the art appreciate, the preparation of homogeneous polyol blends, and resin precursor blends (which latter typically comprise such polyol blends, blowing agent, cell stabilizing surfactant, and trimerization catalyst) in the isocyanate polymerization art can involve multi-component mixtures. While sometimes a blend of different polyols present in a resin precursor blend can overcome fluorocarbon compatibility problems, characteristically when aromatic polyester polyols are used, such compatibility problems are believed to be difficult to overcome without using a compatibility agent.

Aromatic polyester polyols apparently cannot be blended with usable amounts of fluorocarbon blowing agents because of mutual insolubility characteristics causing incompatibility and nonhomogeneity in a resulting mixture. A compatibility agent in such a mixture produces compatibility (mutual solubility in effect) and homogeneity.

A class of amide diols is disclosed in U.S. Pat. No. 4,246,364 as being useful compatibility agents for such polyols and fluorocarbon blowing agents when material of such class is employed at the relatively high rate of from about 20 to 85 weight percent apparently on a 100 weight percent total polyol blend composition weight basis. Certain types of polyols, such as aromatic ester polyols, produced with low molecular weight aliphatic polyols, appear to be so incompatible with fluorocarbon blowing agents that, in a polyol blend containing such aromatic polyester polyols in relatively high percentages, large amounts of such an amide diol appear to be needed to achieve compatibility with fluorocarbon blowing agents. When such a large quantity of amide diol is employed, the cost of foam manufacture increases (because of the cost of the amide diol).

One class of aromatic polyester polyols which has heretofore been successfully employed in this art, and which is relatively incompatible with fluorocarbon blowing agents, but which is compatibilizable therewith by using an amide diol of the above referenced Koehler et al. U.S. Pat. No. 4,246,364, comprises reaction products of a low molecular weight polyether polyol, such as diethylene glycol, with poly(carbomethoxy-substituted) diphenyls and also benzyl esters. Such polyols are available commercially under the trademark "Terate" from ICI Americas, Inc. and "Urol" from UCT, Inc. Such diethylene glycol diphenyl and benzyl esters are commercially used at rates apparently ranging up to about 70 to 90 weight percent of a total polyol blend in making polyisocyanurate foam products. As a class, such "Terate" type polyol compositions are characteristically based on diphenyl esters, while another type of such aromatic ester polyol, the phthalate polyester polyols, are primarily based essentially on single aromatic substituted monophenyl ring structures.

This incompatibility effect appears to be particularly evident when it is desired to utilize phthalate ester polyols in relatively high percentages, but it is desirable to use such phthalate ester polyols in resin precursor systems because they apear to be appreciably less expensive than many prior art polyols which are suitable as reactants with isocyanates to produce polyisocyanurate foams.

Certain monofunctional hydroxyl terminated nonionic surfactants, such as, for example, polyethoxylated alkyl phenol nonionics that contain not more than about 15 moles of condensed ethylene oxide per molelucle and thus have molecular weights substantially below about 900 are believed to have been heretofore used as compatibility agents for polyol/fluorocarbon blowing agent resin precursor systems. These prior art nonionic compatibility agents contain substantially no propylene oxide. Particularly when formulating blends of phthalate ester polyols with fluorocarbon blowing agents, it appears to be necessary, in order to achieve the desired blend homogeneity, to use significantly high concentrations of such prior art nonionic surfactants for specified respective amounts of specified aromatic polyester polyols and fluorocarbon blowing agents which is undesirable not only from a cost standpoint, but also from a standpoint of degrading product foam properties, such as compressive strength. The property degradation can be so great as to make the product foams unusable and unsuitable for conventional commercial foam applications. This property deterioration is attributed in theory (and there is no intent to be bound herein by theory) to the circumstance that the monohydroxyl functionality of such surfactants makes them react as chain terminating components in the polyisocyanurate polymerization reaction, thereby producing excessive amounts of low molecular weight isocyanurate polymer which may result in such losses in product desirable properties.

Thus, there remains a need in the art for new and improved compatibility agents which will permit one to compatibilize polyols, especially aromatic polyester polyols, with fluorocarbon blowing agents and achieve complete blend homogeneity and solubilization without causing any substantial deterioration in product foam properties.

BRIEF SUMMARY OF THE INVENTION

This invention is directed in one respect to a miscible polyol (including diols) blend composition useful in the preparation of polyisocyanurate foams which composition comprises on a 100 weight percent total weight basis:

(A) from about 1 to 40 weight percent of at least one nonionic block ethoxylate propoxylate compound of the formula:

$$RO(CH_2CHO)_n-(CH_2CH_2O)_m-H \quad \text{(1)}$$
$$\underset{X}{|}$$

wherein:
R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

$$(CH_2CH_2O)_m-H,$$

X is selected from the group consisting of methyl and hydrogen,
n is a positive whole number ranging from about 10 to 70,
m is an independently selected positive whole number of from about 15 to 190, and the sum of m plus n is a number in the range from about 25 to 200 in any given molecule:
(B) from about 0.1 to 17 weight percent of at least one amide or amine diol having the formula;

$$R_2R_3-N \begin{matrix} (CH_2CHO)_x-H \\ | \\ R_1 \\ \\ (CH_2CHO)_y-H \\ | \\ R_1 \end{matrix} \quad \text{(2)}$$

wherein:
each $R_1$ is independently selected from the group consisting of hydrogen and methyl,
$R_2$ is an aliphatic radical having from 7 to 35 carbon atoms, inclusive,
$R_3$ is either $$-\underset{}{\overset{O}{\underset{\|}{C}}}- \quad \text{or} \quad -\underset{H}{\overset{H}{\underset{|}{\overset{|}{C}}}}-$$

x and y each have independently an average value between about one and about 20 inclusive;
(C) from about 20 to 93 weight percent of at least one aromatic ester polyol characterized by having a molecular weight in the range from about 250 to 1200, an hydroxyl value ranging from about 45 to 2000, a functionality ranging from 2 to 8, and a molecular structure selected from the group consisting of monophenyl polyesters, diphenyl polyesters, and benzyl polyesters; and
(D) from about 1 to 40 weight percent of at least one other polyol characterized by having a molecular weight in the range from about 60 to 1200, an hydroxyl value in the range from about 45 to 1600, and a functionality in the range from about 2 to 8, and which is preferably selected from the class consisting of the so-called "second hydroxyl containing polyols" hereinbelow identified.

In any given such polyol blend composition of this invention, the above indicated components are selected so as to result in a product polyol blend composition having an hydroxyl number in the range from about 150 to 600.

Preferably, in such a polyol blend composition, such aromatic ester polyol is characterized by the generic formula:

wherein:
x is a positive whole number of from 1 through about 15, and
$R^1$ is a divalent radical selected from the group consisting of:
(a) alkylene radicals each containing from 2 through 6 carbon atoms,
(b) alkoxyalkylene radicals each containing one oxygen atom and from 3 through 7 carbon atoms,
(c) radicals of the formula:

$$-CH_2-R^2-CH_2-$$

$R^2$ is a radical selected from the group consisting of:

$$-\underset{OH}{\overset{H}{\underset{|}{\overset{|}{C}}}}-, \quad -\underset{CH_3}{\overset{CH_3}{\underset{|}{\overset{|}{C}}}}-, \quad -\underset{CH_2OH}{\overset{CH_2OH}{\underset{|}{\overset{|}{C}}}}-, \quad -\underset{CH_2OH}{\overset{CH_3}{\underset{|}{\overset{|}{C}}}}-, \quad \text{and} \quad -\underset{CH_2OH}{\overset{C_2H_5}{\underset{|}{\overset{|}{C}}}}-,$$

and
(d) radicals of the formula:

$$-(R^3O)_n-R^3-$$

$R^3$ is an alkylene radical containing from 2 through 4 carbon atoms and n is an integer of from 2 through 6.

Preferably $R^1$ in formula (2) is a radical such as $-CH_2CH_2OCH_2CH_2-$ (presently most preferred), $-CH_2CHOHCH_2-$, $$-CH_2-\underset{CH_2OH}{\overset{CH_2CH_3}{\underset{|}{\overset{|}{C}}}}-CH_2-,$$

and the like.

This invention is also directed in another aspect to miscible blends comprising a combination of the above polyol blend composition with a fluorocarbon blowing agent (with water as an optional blowing agent also being present.

This invention is also directed in another aspect to miscible blends comprising a combination of an above defined polyol blend composition with a fluorocarbon blowing agent (and optionally water) and an isocyanate trimerization catalyst.

This invention is also directed in another agnt to a process for the preparation of polyisocyanurate cellular polymers which utilize, as a blended component, the above polyol blend composition in combination with a fluorocarbon (and optionally water) blowing agent system and an isocyanate trimerization catalyst in reaction with an organic polyisocyanate.

This invention is further directed in another aspect to the cellular polyisocyanurate polymers produced from the practice of the above process.

This invention is further directed in another aspect to a compatibility agent for use in polyol blends containing fluorocarbon blowing agent and aromatic polyester polyol which compatibility agent is comprised in combination on a 100 weight percent total weight basis of
from about 20 to 70 weight percent of at least one compound of formula (1), and
from about 30 to 80 weight percent of at least one compound of formfula (2).

This compatibility agent preferably is used to make polyol blends and resin blends as herein described.

One primary purpose of the present invention is to provide new polyol blends which find particular utility, as described herein, as minor components in the preparation of new polyisocyanurate foams, particularly those foams prepared in conventional foam laminate machinery and by conventional pour-in-place foam equipment, and which have physical and chemical properties of commercially acceptable level as regards typical end use applications for prior art polyisocyanurate foams, especially in building construction for thermal insulation.

Another primary purpose of the present invention is to provide polyol blends of the type indicated above which are compatible with fluorocarbon blowing agents and which can also contain significant quantities of difficultly compatibilizable aromatic polyester polyols.

Another primary purpose of the present invention is to provide a synergistic mixture of compatibility agents comprised of certain block ethoxylate propoxylate compounds and certain amine and/or amide diol compounds which mixture is operative within a polyol blend containing a range of certain aromatic ester polols as herein described for purposes of making fluorocarbon blowing agents miscible therewith to produce a storage stable system of low viscosity which when foamed produces an acceptable isocyanurate foam.

Other and further purposes, aims, objects, features, advantages, embodiments, and the like will be apparent to those skilled in the art from the teachings of the present specification taken with the claims.

DETAILED DESCRIPTION

The polyol blends of this invention are prepared by simply mixing together, in the quantities above indicated, the respective above indicated components in any suitable mixing zone (vessel, tank, etc.).

Preferably, the nonionic block ethoxylate propoxylate compound(s)I of formulka (1) is (are) employed within a range of from about 2 to 15 weight percent while the aromatic polyester polyol preferably ranges from about 70 to 85 weight percent (same total weight basis as above). Preferably, the second hydroxyl containing polyol is employed at a rate of from about 0 to 20 weight percent (same basis as above).

Preferably, the amide diols of formula (2) is (are) employed within a range of from about 8 to 15 weight percent (same basis as above).

In one presently preferred type of formula (1) compound, R is nonylphenyl, X is methyl, n is about 15 to 70, m is about 40 to 80, and the sum of n plus m extends from about 50 to 150.

Preferably, compounds of formula (1)are prepared by the propoxylation and ethoxylation of an alcohol, such as butanol, or nonyl or octyl phenol, in the presence of the appropriate alkopxylation catalyst, as those skilled in the art appreciate.

Preferably, the aromatic ester polyol(s) of formula (3) is (are) employed at a rate of from about 60 to 85 weight percent (same basis as above). Preferably, the second hydroxyl containing polyols are employed at a rate of from about 0 to 10 weight percent (same basis as above).

A presently preferred group of starting materials for compounds of formula (2) comprises fatty acids, and fatty acid amides of coconut, soy bean and tallow mixtures, and their corresponding amines. A preferred class of diols comprises cocoamides and tallow amides and their corresponding amine counterparts. See, for example, U.S. Pat. No. 4,246,364 for preparation procedures.

Compounds of formula (1) can be prepared by any convenient procedure as those skilled in the art appreciate. By one preferred procedure, phthalic acid anhydride is contacted with a polyol of the formula:

$$HO-R^1-OH \qquad (4)$$

wherein:
R$^1$ is a divalent radical identical to the definition of R$^1$ above in the definition of formula (3).

Preferred polyols of formula (4) are those wherein R$^1$ corresponds to the preferred definition of R$^1$ above in formula (3). Thus, one class of preferred polyester polyols of formula (3) is made using a substantially pure phthalic anhydride.

Examples of suitable glycol starting materials of formula (4) include ethylene glycol, diethylene glycol, propylene glycol, dipropylene glycol, trimethylene glycol, butylene glycols, glycerol, 1,1,1-trimethylolethane, glycerine, 1,1,1-trimethylolpropane, pentaerythritol, and poly (oxyalkylene) polyols containing from two to four carbons atoms derived by the condensation of ethylene oxide, propylene oxide, butylene oxide, and combinations thereof. As those skilled in the art will appreciate, in the preparation of mixed poly(oxyethylene-oxypropylene) polyols, the ethylene and propylene oxides may be added to a starting hydroxyl-containing reactant either in admixture or sequentially. A presently most preferred polyol for reaction with a phthalic anhydride starting material is diethylene glycol.

Preferably, a contacting between phthalic anhydride and a starting polyol of formula (4) above is carried out at a temperature ranging from about 200° to 230° C., though lower and higher temperatures can be employed if desired. During the contacting, the reactants are preferably agitated. Preferably approximately stoichiometric amounts of phthalic anhydride and polyol are employed. Preferably the contacting is continued until the hydroxyl value of the reaction mass falls in the range from about 200 to 600, and also the acid value of the reaction mass ranges from 0 to about 7.

Alternatively, phthalic acid (rather than the anhydride) can be reacted with a polyol of formula (4). In the case of making aromatic poly(oxyalkylene) polyols of formula (3), one can conveniently directly condense the phthalic acid with a desired number of moles of ethylene oxide and/or propylene oxide (either in admixture or sequentially as desired) preferably in the presence of an alkoxylation catalyst.

The esterification reaction used for producing an aromatic polyol of formula (3) may, if desired, be carried out in the presence of a catalyst as those skilled in the art will appreciate. Suitable catalysts includes organotin compounds, particularly tin compounds of carboxylic acids, such as stannous octoate, stannous oleate, stannous acetate, stannous laurate, dibutyl tin dilaurate, and other such tin salts. Additional suitable catalysts include metal catalysts, such as sodium and potassium acetate, tetraisopropyl titanates, and other such titanate salts, and the like.

Typically, the product is a polyester polyol mixture including diols and oligomers. Unreacted quantities of formula (4) polyols are typically present. A typical range for such a quantity is about 6 to 30 weight based on total polyester polyol reaction product.

Another particularly preferred class of compounds of formula (3) is one which is prepared by esterifying a phthalic anhydride bottoms composition, a phthalic anhydride crude composition, or a pththalic anhydride light ends composition, as such compositions are hereinbelow defined, with preferred polyols of formula (3), and the esterification thereof conveniently being carried out as hereinbelow described.

The so-called "other polyol" employable in a polyol composition of this invention as defined above comprises at least one hydroxyl containing polyol which is selected so as to produce a product polyol composition having the hydroxyl number valve in the range above indicated. In general, such other polyol can be any hydroxyl containing polyol (other than a formula (3) polyol) having properties as above indicated. Such other polyol has a molecular weight ranging preferably from about 60 to about 800, and most preferably from about 60 to 600. Included are diols, triols, and tetraols. Examples of suitable classes of polyol types (herein sometimes termed "second hydroxyl containing polyols") include:

(a) poly alkoxylated Mannich bases prepared by reacting phenols with diethanol amine and formaldehyde;
(b) poly alkoxylated glycerines;
(c) poly alkoxylated sucrose;
(d) poly alkoxylated aromatic and aliphatic amine based polyols;
(e) poly alkoxylated sucrose-amine mixtures;
(f) hydroxyalkylated aliphatic monoamines or diamines;
(g) polybutadiene resins having primary hydroxyl groups (see Poly Bd Liquid Resins Product Bulletin BD-3 (October 1974, Arco Chemical Company, Div. of Atlantic Richfield, New York, N.Y.);
(h) polyether polyols including halogenated polyether polyols;
(i) phosphorous containing polyols;
(j) polyols of formula (4) above;
and the like.

Illustrative but non-limiting examples of suitable polyols for use as the second hydroxyl containing polyol include ethylene glycol, diethylene glycol, 1,3-propanediol, 1,4-butane diol, and other butylene glycols, alkoxylated glycerine, dipropylene glycol, trimethylene glycol, 1,1,1-trimethylol propane, pentaerythritol, 1,2,6-hexanetriol, 1,1,1-trimethylolethane, 3-(2-hydroxyethoxy)1,2-propane diol, 1,2-cyclohexanediol, triethylene glycol, tetraethylene glycol, and higher glycols, or mixtures thereof (with molecular weights falling within the range above indicated) ethoxylated glycerine, ethoxylated trimethylol propane, ethoxylated pentaerythritol, and the like, polyethylene succinate, polyethylene glutarate, polyethylene adipate, polybutylene succinate, polybutylene glutarate, polybuthylene adipate, copolyethylenebutylene succinate, copolyethylenebutylene glutarate, copolyethylene butylene adipate, and the like hydroxyl terminated polyesters, bis (beta-hydroxyethyl) terephthalate, bis (beta-hydroxyethyl) phthalate, and the like, di (polyoxyethylene) succinate, polyoxydiethylene glutarate, polyoxydiethylene adipate, polyoxydiethylene adipate glutarate, and the like hydroxyl terminated polyesters; diethanolamine, triethanolamine, N,N'-bis (beta-hydroxyethyl) aniline, and the like, sorbitol, sucrose, lactose, glycosides such as alpha-methylglucoside and alphahydroxyalkyl glucoside, fructoside, and the like; compounds in which hydroxyl groups are bonded to an aromatic nucleus such as resorcinol, pyrogallol, phloroglucinol, di-, tri-, and tetraphenylol compounds, such as bis-(p-hydroxyphenyl)-methane and 2,2-bis-(p-hydroxyphenyl)propane, cocoamides, alkylene oxide adducts of Mannich type products prepared by reacting phenols, diethanolamine and formaldehyde, and many other such polyhydroxyl compounds known to the art.

Presently preferred such are second hydroxyl containing polyols are alkylene and/or lower alkoxy-alkylene diols such as diethylene glycol, dipropylene glycol, mixtures thereof, and the like which each have a molecular weight of from about 62 to 400. By the term "lower" reference is had to a radical containing less than eight carbon atoms. Presently preferred polyol blends contain from about 0 to 18.0 weight percent on a 100 weight percent total polyol blend bases of such preferred diols (as second hydroxyl containing polyols). Presently preferred resin blends utilize such preferred polyol blends.

In preferred polyol blends of this invention, a fluorocarbon (and optionally water) blowing agent is also present. Advantageously, and unexpectedly, such a fluorocarbon blowing agent is miscible with the blend. Typically, in such a blend, at least about 10 weight percent and preferably at least about 20 weight percent (total product blend basis) comprises such fluorocarbon blowing agent with the balance comprising a polyol blend composition as above described. Up to about 50 percent by weight of the composite product blend can comprise fluorocarbon blowing agent with the balance up to 100 weight percent by such polyol blend composition. Up to about 10 weight percent of water can also be used.

The particular percentage of fluorocarbon blowing agent to be dissolved in any given blend will influence in any given composition the exact, or optimized, respective quantities of the individual components employed, particularly the quantity of formula (1) and (2) compound(s) used, within the respective ranges above set forth. In general, the smaller the quantity of compound(s) of formula (3) present in a product blend, the greater is the amount of fluorocarbon blowing agent which can be dissolved in the blend for a given amount of formulas (1) and (2) compound(s) used, there always being present at least sufficient quantity of formfula (1) and (2) compound to render the desired quantity fluorocarbon blowing agent miscible with a polyol blend composition. For this reason, when relatively large quantities of formula (3) compounds are used, within the range indicated above, it is presently preferred to employ, as the second-hydroxyl containing polyol, alkylene diols and/or lower alkoxyalkylene diols each having molecular weights of less than about 400. In any given blend, the particular proportions of a formula (3) polyol(s) relative to the other polyol(s) for a given quantity of formulas (1)+(2) material can be easily determined by one skilled in the art through trial and error in order to determine the amount of fluorocarbon blowing agent incorporatable into a given product blend.

The fluorocarbon blowing agent can be any of the fluorocarbons known to those skilled in the art and which can be used for blowing polymer mixtures into cellular polyisocyanurates. In general, such blowing agents can be, if desired, additionally substituted by chlorine and/or bromine in addition to the fluorine content. Suitable initially liquified blowing agent low boiling gases include aliphatic and cycloaliphatic fluorocarbons which vaporize at or below the temperature of the foaming mass. Such gases are at least partially fluorinated and may also be otherwise halogenated. Illustrative of presently preferred fluorocarbon blowing agents are trichloromono-fluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene, octafluorocyclobutane, and the like; see also U.S. Pat. No. 3,745,133, column 11, lines 25 to 38 which disclosure relating to fluorocarbon blowing agents is incorporated by reference herein. When water is used as a blowing agent, it can be present, if desired, in an amount from zero ranging to about 10 weight percent (total blend basis).

In a preferred embodiment of a polyol blend of this invention, there is additionally present an isocyanate trimerization catalyst on a total weight basis in a range from about 0.5 to 10 weight percent with the balance of about 90 to 99.5 weight percent comprising a polyol blend composition of this invention containing also fluorocarbon blowing agent. Preferably this range extends from about 2 to 8 weight percent with the balance (92 to 98 weight percent) being such a polyol blend composition and fluorocarbon blowing agent.

Minor amounts (typically less than about 15 wt %) of other optional additives can be added to a blend composition of this invention without detracting from the miscibility and stability of product blends. Such other additives include, for example, nonreactive and reactive flame retardants and the like which are commonly employed in the art of making cellular polyisocyanurates.

Surprisingly, the fluorocarbon blowing agent and the polyol blend (with or without the presence of such catalyst) are completely miscible in each other with no separation occuring during storage, such miscibility being due to the presence of compound(s) of formulae (1) and (2). A polyol blend composition with miscible added fluorocarbon blowing agent and catalyst and cell stabilizing surfactant may be reacted with organic isocyanates to produce product polyisocyanurate foams having acceptable physical properties, such as foam stability, friability, compressive strength, and the like.

In the preparation of a polyisocyanurate foam of the present invention, a polyol blend composition in admixture with a fluorocarbon (and optionally water) blowing agent, a cell stabilizing surfactant and a trimerization catalyst forms a so-called resin precursor or B side component or composition for reaction with a so-called A side component or composition comprised of organic polyisocyanate. The respective quantities of B side blend components are as indicated above. Thus, a B blend contains from about 0.5 to 10, preferably about 3 to 6, weight percent of a trimerization cataalyst, and the balance comprises from about 90 to 99.5, preferably about 94 to 97, weight percent, of polyol blend composition in combination with fluorocarbon blowing agent is present in the range from about 10 to 50 weight percent (same basis), with the balance of B side blend components thus being from about 50 to 90 (total weight basis).

In a mixture of B side blend and A side blend, the total hydroxyl equivalents present in such a B side blend at the time of reaction ranges from about 0.20 to 0.50 (and preferably from about 0.20 to 0.40) per hydroxyl equivalent of such A side polyisocyanate.

Polyol blends of this invention can be made separately and converted to a resin blend or such can be found as a part of a resin blend as described herein.

Presently preferred resin precursor blend formulations of this invention (which incorporate polyol blends of this invention) are characterizable as follows:

TABLE I

COMPOSITION OF PREFERRED RESIN PRECURSOR BLENDS (100 weight percent basis)

| Component | wt % preferred range | wt % more preferred range |
| --- | --- | --- |
| (A) nonionic block ethoxylate propoxylate compound of formula (1) | about 1 to 30 | about 2 to 10 |
| (B) amide diol of formula (2) | about 1 to 15 | about 6 to 15 |
| (C) aromatic ester polyol of formula (3) | about 20 to 93 | about 35 to 65 |
| (D) second hydroxyl polyol | from about 1 to 25 | about 1 to 10 |
| (E) fluorocarbon blowing agent | about 10 to 50 | about 20 to 40 |
| (F) water | about 0.1 to 10 | about 0.1 to 2 |
| (G) trimerization catalyst | about 0.5 to 10 | about 3 to 6 |
| (H) cell stabilizing surfactant | about 0.1 to 10 | about 1 to 3 |

Preferably the viscosity of such a formulation of Table I range from about 100 to 900 centipoises at 25° C. (measured with a Brookfield viscometer with a #2 spindle operating at 12 rpm) and the hydroxyl number of the total B side blend thereof falls in the range from about 100 to 300.

It is preferred to employ in the Table I compositions as shown from about 1 to 3 weight percent of (based on total resin or B side component blend) a cell stabilizing surfactant which improves and promotes development of fine, uniform foam cells. Presently preferred such cell stabilizing surfactants are commercially available and include silicones, such as dimethyl polysiloxanepolyalkylene oxide copolymers. Organic cell stabilizing surfactants are also known to this art.

Preferred resin blend formulations of Table I utilize as shown second hydroxyl containing polyols. More preferred second hydroxyl containing polyols are presently dialkylene glycols, such as diethylene glycol, dipropylene glycol, and polyalkyoxylated glycerines containing from about 3 to 6 moles of condensed alkylene oxide.

The trimerization catalyst employed in the practice of this invention can be any catalyst known to those skilled in the art which will catalyze the trimerization of an organic isocyanate compound to form the isocyanurate moiety.

The organic polyisocyanates employable in the practice of this invention can be the same as those previously employed in the art for making polyisocyanurates. Such materials are well known to those skilled in the art.

Among the suitable polyisocyanates are those represented by the general formula:

Q(NCO)  (4)

wherein:

*i* has an average value of at least two, and

Q is an aliphatic, cycloaliphatic or aromatic radical which can be an unsubstituted hydrocarbyl group or a hydrocarbyl group substituted, for example, with halogen or alkoxyl.

For example, Q can be an alkylene, cycloalkylene, arylene, alkyl-substituted cycloalkylene, alkylene or aralkylene radical including corresponding halogen-substituted radicals. Typical examples of suitable polyisocyanates known to the art for use in preparing cellular polyisocyanurates are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyante, 2,4-tolulene diisocyanates, crude tolylene diisocyanate, 6-isopropyl-1,3-phenylenediisocyanate, durylene diisocyanate and triphenylmethane-4,4',4''-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid catalyzed condensation of aniline with formaldehyde. Polyphenylmethylene polyisocyanates of this type are available commerically under such trade names as PAPI, Mondur, Rubinate, and the like. These products are low viscosity (50–1000 centipoises at 25° C.) liquid having average isocyanate functionalities in the range of about 2.0 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-toluene diisocyanate, 2,6-toluene diisocyanate and the aforesaid polyphenyl-methylene polyisocyanates; and a mixture of isomeric toluene diisocyanates with polymeric toluene diisocyanates obtained as residues from the manufacture of the diisocyanates.

One presently preferred polyfunctional organic polyisocyanate comprises polymethylene polyphenyl polyisocyanates containing significant levels of the 2-4'-isomer as disclosed, for example, in U.S. Pat. No. 3,362,979. A presently most preferred organic polyisocyanate is a mixture containing from about 30 to 85 weight percent of methylene bis(phenylisocyanate) with the remainder being polymethylene polyphenyl polyisocyanate of functionality higher than 2.0 (on a 100 weight percent total polyisocyanate basis).

In making the polyisocyanurate foams of this invention, especially laminates of such foams, the procedures and equipment conventional in the art are employed; see, for example, U.S. Pat. No. 3,896,052.

One preferred compatibility agent of this present invention comprises in combination on a 100 weight percent total agent basis:

from about 40 to 80 weight percent of at least one compound of formula (2), from about 20 to 60 weight percent of at least one compound of formula (1), and from 0 to about 40 weight percent of at least one compound of formula (4).

In such a compatibility agent, one presently preferred formula (2) material is an ethoxylated cocoamine or an ethoxylated cocoamide wherein the number of moles of combined ethylene oxide ranges from about 5 to 15. Similarly, one presently preferred formula (1) compound as described in Example H below. Also similarly, one presently preferred formula (4) compound is diethylene glycol. The presence of such a formula (4) compound aids in making this agent exist in a liquid or slurry form and also serves in making this agent more reactive [after blending with an aromatic ester polyol which is preferable of formula (3) and with other materials as described herein to produce polyol blends and resin blends for reaction with isocyanates to produce preferably polyisocyanurate foams].

EMBODIMENTS

The following examples are merely illustrative of the present invention and are not intended as a limitation upon the scope thereof.

Starting Materials:

EXAMPLE A

Diesters of Formula (3)

Phthalic anhydride of greater than 99.9 weight percent purity (available commercially from Stepan Chemical Company, Northfield, Illinois) is reacted with diethylene glycol as follows:

To a 3 liter, four-neck, round-bottom flask equipped with a stirrer, thermometer, nitrogen inlet tube, and a goose-neck condenser, there is added 740 grams (5 moles) of phthalic anhydride, and 1060 grams (10 moles) of diethylene glycol. The mixture is heated to 220° C. with stirring and kept at this temperature until the rate of water being removed slowed down.

Stannous octoate (100 ppm) is then added to the mixture and the heating continued until the acid number reached 6.2. The reaction mixture is then cooled to room temperature and analyzed. The hydroxyl number is found to be 228 and the acid number 6.2. Diethylene glycol is added to the mixture to increase the hydroxyl number to 315.

The product produced comprises diethylene glycol phthalate and has the following general structural formula:

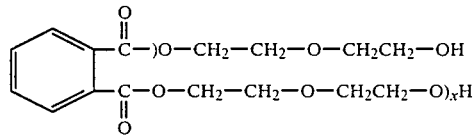

where x ranges from about 1 to 15.

On HPLC+GC analysis, the following oligomer structures are discovered:

TABLE

| Components (molar combinations) | Compound percentage (100 wt % basis) |
| --- | --- |
| PA² + 1 DEG³ | 1.2 |
| PA + 2 DEG | 27.7 |
| 2 PA + 3 DEG | 25.9 |
| 3 PA + 4 DEG | 14.6 |
| 4 PA + 5 DEG | 6.2 |

TABLE-continued

| Components (molar combinations) | Compound percentage (100 wt % basis) |
| --- | --- |
| 5 PA + 6 DEG | 3.2 |
| 6 PA + 7 DEG | 1.7 |
| 7 PA + 8 DEG | 0.7 |
| 8 PA + 9 DEG | 0.3 |
| 9 PA + 10 DEG | 0.1 |
| 10 PA + 11 DEG | 0.1 |
| 11 PA + 12 DEG | — |
| Unknown materials | 4.5 |
| free DEG | 13.8 |
| Calculated mole ratio DEG/PA | 2.02 |

[1] The unknown materials appear in the chromatogram as extra peaks in between the various oligomer peaks.
[2] PA denotes Phthalic Anhydride
[3] DEG denotes Diethylene Glycol This product is a colorless liquid having a viscosity of about 2500 centipoises at 25° C. and an hydroxyl number of about 318.

Those skilled in the art will appreciate that the composition of a reaction produced of phthalic anhydride with a polyol of formula (4) will vary depending upon many variables including process conditions, polyol(s) used, and mole rations of reactants.

EXAMPLE B

The phthalic anhydride of Example A is reacted with 1,1,1-trimethylolpropane as follows:

To a 5 liter, four-neck, round-bottom flask equipped with a stirrer, thermometer, nitrogen inlet tube, and a goose-neck condenser, there is added 10 moles of phthalic anhydride and 20 moles of trimethylolpropane. The mixture is heated to 190° C. with stirring and kept at this temperature until the acid number is 5. The reaction mixture is then cooled to room temperature and analyzed. The hydroxyl number of the liquid polyester polyol phthalate product is found to be 565.2. The product is a gel-like material at 25° C.

This product comprises a polyester polyol reaction product which falls within the scope of formula (3) above in admixture with unreacted trimethylopropane.

The polyester polyol reaction product includes the following compound:

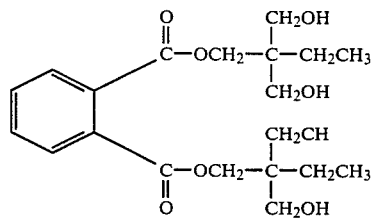

EXAMPLE C

To a 5 liter, four-neck, round-bottom flask equipped with a stirrer, thermometer, nitrogen inlet tube, and a goose-neck condenser, there is added 1480 grams (10 moles) of phthalic anhydride and 2360 grams (20 moles) of 1,6-hexanediol. The mixture is heated to 190° C. with stirring and kept at this temperature until the acid number is 6 or lower. The reaction mixture is then cooled to room temperature and analyzed. The hydroxyl number is found to be 302.

This product comprises a polyester polyol reaction product which falls within the scope of formula (3) above in admixture with unreacted 1,6-Hexamediol.

EXAMPLE D

To a 5 liter, four-neck, round-bottom flask equipped with a stirrer, thermometer, nitrogen inlet tube, and a goose-neck condenser, there is added 740 grams (5 moles) of phthalic anhydride and 1940 grams (10 moles) of tetraethylene glycol. The mixture is heated to 220° C. with stirring and kept at this temperature until the acid number reaches 6. The reaction mixture is then cooled to room temperature and analyzed. The hydroxyl number of the colorless liquid product is found to be 238.

This product comprises a polyester polyol reaction product which falls within the scope of formula (3) above in admixture with unreacted tetraethylene Glycol.

EXAMPLE E

A specimen of a phthalic anhydride bottoms composition is obtained having:
(a) a phthalic anydride content of about 60 weight percent (total composition basis),
(b) a hydroxyl number estimated to be about 0, and
(c) an acid number estimated to be about 700.

To a 3 liter, four-neck, round-bottom flask equipped with a stirrer, thermometer, nitrogen inlet tube and a goose-neck condenser there is added at ambient temperature and pressure 740 grams of the above pulverized phthalic anhydride bottoms and 1060 grams (10 moles) of diethylene glycol. The mixture is heated to 220° C. and kept at this temperature until the acid number of the reactant mixture is found to be 7.0. The mixture of the esterified products and oligomers is then cooled to room temperature and the hydroxyl number of the relatively viscous black liquid product is determined and found to be about 312.

This product comprises a polyester polyol reaction product which falls within the scope of formula (3) above in admixture with unreacted Diethylene glycol.

Phthalic Anhydride Crude, Bottoms and Light Ends

The phthalic anhydride bottoms used as a starting material in the practice of the present invention results from the process of converting o-xylene to phthalic anydride. This process is understood to be carried out by the steps of:
(A) contacting the presence of excess oxygen (air) o-xylene of at least about 95 weight percent purity (on a total starting feed basis) with (preferably) a vanadium catalyst under vapor phase conditions involving a temperature ranging from about 360° to 400° C., and a pressure ranging from above 0 to about 10 psig, which conditions are maintained for a time sufficient to convert theoretically at least about 96 weight percent of the total starting o-xylene to phthalic anhydride,
(B) desubliming the vapor phase product stream from the above contacting the produce a solid material at a temperature typically ranging from about 50° to 70° C. under about atmospheric pressure,
(C) first heating the solid so produced to a temperature not less than about 130° C. which temperature is sufficient to liquefy such solid at about atmospheric pressure,
(D) secondly heating the liquid so produced to a temperature ranging from about 270° to 295° C. for a time at least sufficient to convert at least about 99 weight percent of all phthalic acid material in such liquid into phthalic anhydride, (E) first distilling the resulting liquid at a vapor phase temperature ranging from about 220° to 240° C. while maintaining an absolute pressure in the range from about 250 to 150 mm Hg and collecting and condensing substantially all such first distillate so produced, the first raffinate being so produced from such first distilling being maintained at a temperature ranging from about 240° to 260° C., and (F) secondly distilling said first raffinate at a vapor phase temperature ranging from about 240° to 260° C. while maintaining an absolute pressure in the range from about 250 to 350 mm Hg and collecting and condensing substantially all such second distillate so produced, the second raffinate being so produced in such second distilling being maintained initially at a temperature ranging from about 260° to 280° C.

The first distillate so produced is known as "light ends" or "phthalic anhydride light ends", while the second distillate so produced comprises substantially pure phthalic anhydride. The second raffinate so produced is known as "bottoms" or "phthalic anhydride bottoms". The resulting liquid from the first heating is known as "crude" or "phthalic anhydride crude". The first and second distilling steps can be carried out either batchwise or continuously, as those skilled in the art appreciate. The crude, the light ends and the bottoms can each be regarded as having a somewhat variable composition, such compositional variations being the result of variations in the starting o-xylene feed, and also of variations in the exact conditions employed for the respective process steps.

Therefore, it is very difficult to state that the exact compositions of, respectively, all possible crude, light ends and bottoms. Nevertheless, the respective characteristic compositions of crude, light ends and bottoms are distinctly different from one another. For example, a typical phthalic anhydride crude composition is now believed to be as follows (on a 100 weight percent total composition basis):

| component | weight percent |
|---|---|
| (1) phthalic anhydride | 96–99 |
| (2) trimellitic acid and/or acid anhydride | 0.2–0.3 |
| (3) benzoic acid and/or acid anhydride | 0.1–0.2 |
| (4) unknown components | balance to 100% |

Similiarly, and for example, a typical phthalic anhydride light ends composition is now believed to be as follows (on a 100 weight percent total composition basis):

| component | weight percent |
|---|---|
| (1) phthalic anhydride | 45–90 |
| (2) benzoic acid or benzoic acid anhydride | 7–42 |
| (3) maleic acid or maleic acid anhydride | 3–13 |
| (4) other components | less than 1.0% |

Similarly, and for example, a typical bottoms is now believed to have the following composition (on a 100 weight percent total basis):

| (1) phthalic anhydride | 50–95 |
|---|---|
| (2) trimellitic acid and/or trimellitic acid anhydride | 1–20 |
| (3) anthraquinone | 0.5–4 |
| (4) isophthalic acid or isophthalic acid anhydride | 0.3–2 |
| (5) unknown insolubles (as determined, for example, by using acetone as the solvent) | 3–35 |

Thus, characteristically, phthalic anhydride light ends contain mainly phthalic anhydride plus benzoic acid or benzoic acid anhydride plus maleic acid anhydride (or maleic acid), while characteristically phthalic anhydride bottoms conntain mainly phthalic anydride, trimellitic acid and/or trimellitic acid anhydride, plus unknown insolubles. Characteristically, phthalic anhydride crude contains phthalic anhydride, phthalic acid, trimellitic acid (and/or trimellitic acid anhydride), plus benzoic acid (and/or benzoic acid anhydride), and unknown insolubles.

In actual commercial practice, it is believed that, in a bottoms composition, the quantity of phthalic anhydride present could range from a low of about 10 weight percent to a high of about 96 weight percent on a 100 weight percent total bottoms basis, with the balance up to 100 weight percent thereof in any given bottoms compositions being mainly trimellitic acid and/or trimellitic acid anhydride plus unknown isolubles.

Similarly, in actual commercial practice, it is believed that, in a light ends composition, the quantity of phthalic anhydride present can range from a low of about 45 weight percent up to a high of about 90 weight percent on a 100 weight percent total light ends basis, with the balance up to 100 weight thereof in any given light ends composition being mainly benzoic acid, (or benzoic acid anhydride) and maleic acid anhydride (or maleic acid).

Esterification

In accordance with the present invention, a starting phthalic anhydride bottoms composition is selected which has the following characteristics:

TABLE II

| Characteristic | Broad Range | Preferred Range |
|---|---|---|
| hydroxyl number | about 0 | about 0 |
| acid number | 100–725 | 450–600 |

Alternatively, a crude or light ends composition is employed. With such a starting phthalic anhydride bottoms composition is admixed at least one polyol of formula (4) above to produce an initial mole ratio of said polyol to said phthalic anhydride bottoms composition in the range from about 2.0 to 3.5 based upon an estimate of the total acid (e.g., carboxylic acid and/or carboxylic acid anhydride) content of said phthalic anhydride bottoms composition. A presently most-preferred polyol for reaction with phthalic anhydride bottoms starting material is diethylene glycol.

Although phthalic anhydride bottoms comprise mainly phthalic acid anhydride, the remaining components of the phthalic anhydride bottoms mainly appear to comprise components which are acidic in nature and which react with the polyol of formula (4) presumably to produce ester byproducts, although the exact composition of the reaction product of a polyol of formula (4)

and phthalic anhydride bottoms is at this time not known.

It is a suprising and unexpected fact that, despite the complex nature of the composition produced by reacting phthalic anhydride bottoms with a polyol formula (4), there is produced a product polyol blend which can be readily and simply utilized for reaction with isocyanate to produce (in the presence of appropriate catalyst) polyisocyanurate foams which have excellent properties that appear generally to be about equal to the properties of corresponding foams made with esters produced by reacting substantially pure phthalic anhydride with polyol of formula (4) as in Example A.

A given mixture of phthalic anhydride bottoms composition and polyol, for esterification to occur, is heated with mixing at a temperature ranging from about 195° to 250° C. (preferably from about 210° to 240° C.) under liquid phase conditions. This heating or contacting between polyol and phthalic anhydride bottoms composition is continued until a desired extent of esterification has been achieved. Preferably such heating is continued until the resulting product reaches an hydroxyl number ranging from about 200 to 600 and an acid number ranging from about 0.5 to 7, and more preferably until such reaches an hydroxyl number ranging from about 270 to 400 and an acid number ranging from about 2 to 7.

EXAMPLE F

An alkoxylated glycerine is obtained from Stepan Chemical Company under the trade designation "Stepan Foam Polyol 2403". This material has the following characteristics:
hydroxyl number: about 230–245,
functionality: about 3,
molecular weight; about 700.

EXAMPLE G

An alkoxylated sucrose is obtained from Stepan Chemical Company under the trade designation "Stepan Foam Polyol 3708". Such alkoxylated sucrose has the following characteristics:
hydroxyl number: about 365 to 395,
functionality: about 8,
molecular weight: about 1200.

EXAMPLE H

A 17006 pound batch of a presently preferred nonionic block ethoxylate propoxylate of nonyl phenol is produced by first charging 3,900 lbs of appropriate nonyl phenol feed stock to an appropriate alkoxylation reactor of the proper size. This material is then heated to 110° C. and an appropriate amount of potassium hydroxide catalyst is added. After the addition of the catalyst, 4106 pounds of propylene oxide (about 35 moles of addition) is added slowly. Care should be taken to maintain a reaction temperature of between 110° to 160° C. during the addition of the propylene oxide. After this addition, the reactor is brought to approximately 110° and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both EO and PO additions.

The product has about the following characteristics:
molecular weight: about 4800,
hydroxyl number: about 12,
functionality: about 1,
physical state: solid at 25° C.

EXAMPLE I

An ethoxylated proproxylated butanol is abtained as "Tergitol XH" from Union Carbide Company. This product has about the following approximate characteristics:
molecular weight: about 2400 to 3500,
hydroxyl number: about 13 to 24,
functionality: about 1,
physical state: solid at 25° C.,
moles ethylene oxide condensed: about 20 to 50,
moles/propylene oxide condensed: about 20 to 50.
See U.S. Pat. No. 3,078,315.

EXAMPLE J

An ethoxylated propoxylated ethoxylate is obtained as "Pluronics P-75" from BASF Wyandotte Company. This product has about the following approximate characteristics:
molecular weight: about 3500 to 14000,
hydroxyl number: about 8 to 32,
functionality: about 2,
physical state: solid at 25° C.,
moles ethylene oxide condensed: 30 or more,
moles propylene oxide condensed: 30 or more.

EXAMPLE K

An organic polyisocyanate trimerization catalyst is obtained under the trade designation "Curithane 97" from the Upjohn Company of Kalamazoo, Mich.

EXAMPLE L

A silicone cell stabilizing surfactant is obtained under the trade designation "DC-193" from Dow Corning Company. This surfactant is believed to be comprised of a polyalkylene oxide silicone.

EXAMPLE M

A fluorocarbon blowing agent is obtained under the trade designation: "Freon 11" from E. I. du Pont & Nemours and Co., Wilmington, Del. This agent is believed to comprise trichloromonofluoromethane.

EXAMPLE N

A diphenyl polyester polyol is obtained under the trademark "Terate 203" from ICI Americas, Inc. This material is believed to comprise a diphenyl polyester polyol.

EXAMPLE O

An organic polyisocyanate is obtained under "Papi 135" from the UpJohn Company of Kalamzoo, Mich. This material is believed to comprise polymethylene polyphenyl polyisocyanate.

EXAMPLE P

To a 5 liter, four-neck, round-bottom flask equipped with a stirrer, thermometer, nitrogen inlet tube, and a goose-neck condenser, there is added 1480 grams (10 moles) of phthalic anhydridge, 1060 grams (10 moles) of diethylene glycol, and 1340 grams (10 moles) of trimethlolpropane. The mixture is heated to 220° C. with stirring and kept at this temperature until the acid number is 6. The hydroxyl number of the colorless liquid polyester polyol phthalate product is found to be 434. 220° C. with stirring and kept at this temperature until the acid number is 6. The hydroxyl number of the colorless liquid polyester polyol phthalate product is found to be 434.

EXAMPLE Q

The procedure of Example A is repeated except that an equivalent of 1 mole of glycerine and 1 mole of diethylene glycol in admixture are reacted with 1 mole of phthalic anhydridge to produce a polyester polyol product having an hydroxyl number of about 496.

EXAMPLE R

The procedure of Example A is repeated except that an equivalent of 2 moles of glycerine is reacted with 1 mole of phthalic anhydridge to produce a polyester polyol having an hydroxyl number of about 598.

EXAMPLE S

An alkoxylated amine diol is obtained under the trade designation "Varonic K-215" from Sherex Chemical Company. This material is believed to comprise a tertiary ethoxylated cocamine containing approximately 15 moles of ethoxylation and having the following characteristics:
Hydroxyl number: about 102,
Functionality: about 2.0,
Equivalent weight: about 550,
Physical state: liquid.

EXAMPLE 1

Compositions of the Invention

The following polyol blend, resin blend, and polyisocyanurate foam are prepared in accordance with this invention. First, a polyol blend of the starting polyols is prepared by hand mixing the components together. The nonionic block ethoxylate propoxylate compound here is a condensate of nonyl phenol with first 35 moles of propylene oxide and then 65 moles of ethylene oxide (Example H). The aromatic polyester polyol is diethylene glycol phthalate (Example A).

Next, the catalyst (Example K) and the cell stabilizing surfactant (Example L) are dissolved in the polyol blend and, finally, the fluorocarbon blowing agent (Example M) is dissolved in the system to produce a resin procursor blend (B-side system).

The polyol blend and also the resin precursor blend are each clear liquids which are self life stable.

The resulting resin precursor blend is mixed with the isocyanate of Example O in a weight ratio of 40.6-59.4 resin precursor blend to organic isocyanate. The mixing operation is carried out in a 1 quart cup using a 3500 rpm electric motor driving a stirrer blade. After thorough mixing, the mixture is rapidly poured into a 12"×12"×6" box and allowed to rise freely and cure at room temperature Results are summarized below:

| Foam Composition | wt % (100 wt % basis) |
|---|---|
| polyphenyl methylene diisocyanate of Example O | 59.4 |
| Resin precursor blend (as prepared above) | 40.6 |

Mixture properties are shown in Tables III and IV below and the product foam characteristics are also shown in Table V below.

EXAMPLES 2-17

The procedure of Example 1 is repeated with various changes in composition to produce first a plurality of respective polyol blends as shown in TABLE III below and the respective corresponding resin blends therefrom incorporating each such polyol blend as summarized in Table IV below.

All product polyol and resin blends are clear liquids initially which show no signs of separation or turbidity on storage.

When converted to a foam by the procedure of Example 1, fine cell structured commercially acceptable foams are produced. Property data is shown in Table V below:

Among the starting materials of Example A-E, N and P, Q, R, any one or more thereof can be blended in quantities as taught herein to make polyol and/or resin blends of this invention.

TABLE III

| Starting Material Ex. I.D. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Ex. A | 85.1 | 80.2 | 75.2 | 70.3 | 68.1 | 74.8 | 61.5 | 58.2 | 61.5 | 61.5 | | | 53.2 | 54.4 | | 70.0 | |
| Ex. E | | | | | | | | | | | 61.5 | 61.5 | | | 61.5 | | 70 |
| Ex. Q | | | | | | | | | | | | | 2.5 | | | | |
| Ex. B | | | | | | | | | | | | | | 6.0 | | | |
| Ex. R | | | | | | | | | | | | | 2.5 | | | | |
| Ex. F | | | | | | | | | | | | | | 3.3 | | | |
| Ex. G | | | | | | | | | | | | | | 3.3 | | | |
| Diethylene Glycol | | | | | 7.1 | 10.4 | 13.7 | 17.0 | 13.7 | 13.7 | 13.7 | 13.7 | 8.7 | 13.2 | 13.7 | | |
| Dipropylene Glycol | | | | | | | | | | | | | 8.3 | | | | |
| Ex. H | 5.0 | 6.6 | 8.3 | 9.9 | 8.3 | 8.3 | 8.3 | 8.3 | | | | | 8.3 | 18.2 | 8.3 | | |
| Ex. I | | | | | | | | | 8.3 | | 8.3 | | | | | | |
| Ex. J | | | | | | | | | | 8.3 | | 8.3 | | | | | |
| Ex. S | 9.9 | 13.2 | 16.5 | 19.8 | 16.5 | 16.5 | 16.5 | 16.5 | 16.5 | 16.5 | 16.5 | 16.5 | 16.5 | 1.6 | 16.5 | 30.0 | 30 |

TABLE IV

| Starting Material Ex. I.D. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Ex. A | 51.5 | 48.5 | 45.5 | 42.5 | 41.2 | 39.2 | 37.2 | 35.2 | 37.2 | 37.2 | | | 32.2 | 32.9 | | 42.3 | |
| Ex. E | | | | | | | | | | | 37.2 | 37.2 | | | 37.2 | | 42.3 |
| Ex. Q | | | | | | | | | | | | | 1.5 | | | | |
| Ex. B | | | | | | | | | | | | | | 3.6 | | | |
| Ex. R | | | | | | | | | | | | | 1.5 | | | | |
| Ex. F | | | | | | | | | | | | | | 2.0 | | | |
| Ex. G | | | | | | | | | | | | | | 2.0 | | | |
| Diethylene Glycol | | | | 4.3 | 6.3 | 8.3 | 10.3 | 8.3 | 8.3 | 8.3 | 8.3 | 8.3 | 5.3 | 8.0 | 8.3 | | |
| Dipropylene Glycol | | | | | | | | | | | | | 5.0 | | | | |
| Ex. H | 3.0 | 4.0 | 5.0 | 6.0 | 5.0 | 5.0 | 5.0 | 5.0 | | 5.0 | | | 5.0 | 11.0 | 5.0 | | |
| Ex. I | | | | | | | | | 5.0 | | 5.0 | | | | | | |
| Ex. J | | | | | | | | | | 5.0 | | 5.0 | | | | | |
| Ex. S | 6.0 | 8.0 | 10.0 | 12.0 | 10.0 | 10.0 | 10.0 | 10.0 | 10.0 | 10.0 | 10.0 | 10.0 | 10.0 | 1.0 | 10.0 | 18.2 | 18.2 |
| Ex. K | 5.4 | 5.4 | 5.4 | 5.4 | 5.4 | 5.4 | 5.4 | 5.4 | 5.4 | 5.4 | 5.4 | 5.4 | 5.4 | 5.4 | 5.4 | 5.4 | 5.4 |
| Ex. L | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 | 2.6 |
| Ex. M | 31.5 | 31.5 | 31.5 | 31.5 | 31.5 | 31.5 | 31.5 | 31.5 | 31.5 | 31.5 | 31.5 | 31.5 | 31.5 | 31.5 | 31.5 | 31.5 | 31.5 |

TABLE V

Properties

| | 1* | 2 | 3 | 4 | 5 | 6 | 7 | 8 | 9 |
|---|---|---|---|---|---|---|---|---|---|
| Resin appearance at 24 hours | Hazy+ Sep. | Clear/ Stable | Clear/ Stable | Clear/ Stable | Clear/ Stable | Clear/ Stable | Clear/ Stable | Clear/ Stable | Clear/ Stable |
| Resin viscosity at 25° C. | 407 cps | 335 cps | 271 cps | 229 cps | 205 cps | 176 cps | 159 cps | 143 cps | 171 cps |
| NCO/OH index | 300 | 300 | 300 | 300 | 300 | 300 | 300 | 300 | 300 |
| Reactivity Profile at 25° C. | | | | | | | | | |
| Cream time, sec. | 11 | 10 | 9 | 7 | 11 | 9 | 8 | 10 | 14 |
| String time, sec. | 54 | 48 | 42 | 37 | 36 | 34 | 34 | 37 | 38 |
| Tack-Free time, sec. | 77 | 70 | 60 | 52 | 45 | 40 | 38 | 40 | 46 |
| Surface Friability | Slight | Slight | None | None | None | None | None | None | None |
| Suface blush | Slight | Slight | Slight | Slight | Yes | Yes | Yes | Yes | Yes |
| Core density, pcf | 1.63 | 1.59 | 1.53 | 1.53 | 1.73 | 1.82 | 1.82 | 1.90 | 1.91 |

| | 10 | 11 | 12 | 13 | 14 | 15 | 16 | 17 |
|---|---|---|---|---|---|---|---|---|
| Resin appearance at 24 hours | Clear/ Stable | Clear/ Stable | Clear/ Stable | Clear/ Stable | Clear/ Stable | Clear/ Stable | Clear/ Stable | Clear/ Stable |
| Resin viscosity at 25° C. | 149 cps | 302 cps | 300 cps | 114 cps | 565 cps | 301 cps | 150 cps | 400 cps |
| NCO/OH index | 300 | 300 | 300 | 300 | 300 | 300 | 300 | 300 |
| Reactivity Profile at 25° C. | | | | | | | | |
| Cream time, sec. | 14 | 19 | 20 | 15 | 30 | 20 | 9 | 10 |
| String time, sec. | 39 | 47 | 50 | 41 | 66 | 48 | 37 | 40 |
| Tack-Free time, sec. | 47 | 60 | 62 | 48 | 74 | 61 | 77 | 80 |
| Surface Friability | None | None | None | None | None | None | None | None |
| Surface blush | Yes | Yes | Yes | Yes | Yes | Yes | slight | Slight |
| Core density, pcf | 1.91 | 2.03 | 2.0 | 1.88 | 2.30 | 2.0 | 1.8 | 1.8 |

*This example (1) shows the point of incompatibility, when remixed a foam is prepared

I claim:

1. A polyol blend composition useful in the preparation of polyurethane foams comprising on a 100 weight percent total weight basis:
   (A) from about 1 to 40 percent of at least one non-ionic block ethoxylate propoxylate compound of the generic formula:

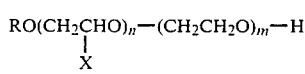

wherein:
   R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

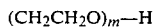

X is selected from the group consisting of methyl and hydrogen,
   n is a positive whole number ranging from about 10 to 70,
   m is an independently selected positive whole number of from about 15 to 190, and
   the sum of m plus n is a number in the range from about 25 to 200 in any given molecule;
   (B) from about 0.1 to 17 weight percent of at least one diol of the formula:

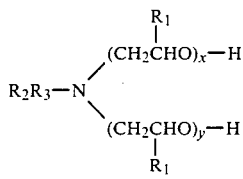

wherein:
each $R_1$ is independently selected from the group consisting of hydrogen and methyl,
$R_2$ is an aliphatic radical having from 7 to 35 carbon atoms, inclusive
$R_3$ is either

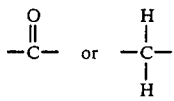

x and y each have independently an average value between about one and about 20 inclusive;

(C) from about 20 to 93 weight percent of an aromatic ester polyol blend characterized by having a molecular weight in the range from about 250 to 1200, an hydroxyl value ranging from about 45 to 2000, a functionality ranging from 2 to 8, and a molecular structure selected from the group consisting of monophenyl polyesters, diphenyl polyesters, and benzyl polyesters; and (D) from and including 1 to about 40 weight percent of at least one other polyol characterized by having a molecular weight in the range from about 60 to 1200, an hydroxyl value in the range from about 45 to 1600, and a functionality in the range from about 2 to 8, and which is selected from the class of polyols:

(a) poly alkoxylated Mannich bases prepared by reacting phenols with diethanol amine and formaldehyde;
(b) poly alkoxylated glycerines;
(c) poly alkoxylated sucrose;
(d) poly alkoxylated aromatic and aliphatic amine based polyols;
(e) poly alkoxylated sucrose-amine mixtures;
(f) hydroxyalkylated aliphatic monoamines or diamines;
(g) polybutadiene resins having primary hydroxyl groups
(h) polyether polyols;
(i) phosphorous containing polyols,
(j) polyols of the formula:

HO—R¹—OH wherein:
$R^1$ is a divalent radical selected from the group consisting of:
(a) alkylene radicals each containing from 2 through 6 carbon atoms;
(b) alkoxyalkylene radicals each containing one oxygen atom and from 3 through 7 carbon atoms,
(c) radicals of the formula:

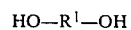

$R^2$ is a radical selected from the group consisting of:

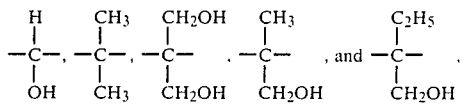

(d) radicals of the formula:

—(R³O)ₙ—R³—

$R^3$ is an alkylene radical containing from 2 through 4 carbon atoms and
n is an integer of from 2 through 6,
preferably $R^1$ in formula (2) is a radical such as —CH₂CH₂OCH₂CH₂— (presently most preferred), —CH₂CHOHCH₂—

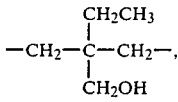

and the like,
said polyol blend composition having an hydroxyl number in the range from about 150 to 600.

2. The polyol blend composition of claim 1 wherein said aromatic ester polyol mixture is characterized by the generic formula:

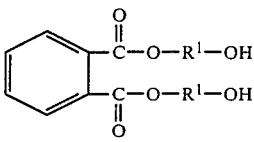

wherein:
x is a positive whole number of from 1 through about 15, and
$R^1$ is a divalent radical selected from the group consisting of:
(a) alkylene radicals each containing from 2 through 6 carbon atoms,
(b) alkoxyalkylene radicals each containing one oxygen atom and from 3 through 7 carbon atoms,
(c) radicals of the formula:

—CH₂—R²—CH₂—

$R^2$ is a radical selected from the group consisting of:

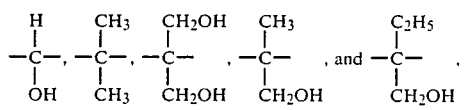

(d) radicals of the formula:

—(R³O)ₙ—R³—

$R^3$ is an alkylene radical containing from 2 through 4 carbon atoms and
n is an integer of from 2 through 6.

3. A miscible blend composition comprising on a 100 weight percent total weight basis:

(A) from about 10 to 50 weight percent of a fluorocarbon blowing agent, (B)) from and including 0 up to about 10 weight percent water, (C) the balance up to 100 weight percent being a polyol blend composition of claim 1 and claim 2.

4. The blend composition of claim 3 additionally including from about 0.5 to 10 weight percent of a trimerization catalyst.

5. The blend composition of claim 4 additionally including from about 0.5 to 5 weight percent of cell stabilizing surfactant.

6. The blend of claim 5 wherein said aromatic polyester polyol comprises diethylene glycol phthalate.

7. In a process for the preparation of a cellular polymer in which the major recurring polymer unit is an isocyanurate moiety, said process comprising the trimerization of an organic isocyanate in the presence of at least one polyol composition of claim 1, a fluorocarbon blowing agent, and a trimerization catalyst, the improvement which comprises preparing said cellular polymer by bringing together an organic polyisocyanate, and a resin precursor blend, of claim 5, there being in such combination from about 0.10 to 0.55 hydroxyl equivalents of said resin precursor blend per equivalent of said polyisocyanate.

8. The process of claim 7 wherein said polyisocyanate is a polymethylene polyphenyl polyisocyanate.

9. The process of claim 7 wherein said one aromatic polyester polyol is diethylene glycol phthalate.

10. A process for the preparation of a cellular polymer in which the major recurring unit is an isocyanurate moiety, said process comprising bringing together a polymethylene polyphenyl polyisocyanate, and a blend of claim 6, there being from about 0.10 to 0.55 equivalents of said blend of claim 6 per equivalent of said polyisocyanate.

11. The process of claim 10 wherein said aromatic polyester polyol is diethylene glycol phthalate.

12. The cellular polyisocyanurate produced by the process of claim 7.

13. The cellular polyisocyanurate produced by the process of claim 10.

14. The polyol blend composition of claim 1 wherein said other polyol is selected from the group consisting of alkylene diols, lower alkoxyalkylene diols, and mixtures thereof having molecular weights from about 62 to 400.

15. A compatibility agent for polyol blends containing fluorocarbon blowing agent and aromatic polyester polyol consisting of in combination on a 100 weight percent total weight basis from about 20 to 70 weight percent of at least one compound of the formula:

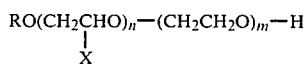

wherein:

R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

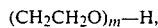

X is selected from the group consisting of methyl and hydrogen, n is a positive whole number ranging from about 10 to 70, m is an independently selected positive whole number of from about 15 to 190 and the sum of m plus n is a number in the range from about 25 to 200 in any given molecule; and from about 30 to 80 weight percent of at least one compound of the formula:

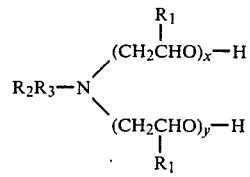

wherein:

each $R_1$ is independently selected from the group consisting of hydrogen and methyl, $R_2$ is an aliphatic radical having from 7 to 35 carbon atoms, inclusive, $R_3$ is either

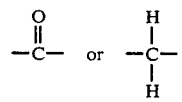

x and y each have independently an average value between about one and about 20 inclusive.

16. A compatibility agent for polyol blends containing fluorocarbon blowing agent and aromatic polyester polyol consisting of in combination on a 100 weight percent total weight basis from about 40 to 80 weight percent of at least one diol compound of the formula:

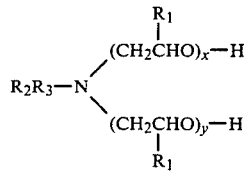

wherein:

each $R_1$ is independently selected from the group consisting of hydrogen and methyl, $R_2$ is an aliphatic radical having from 7 to 35 carbon atoms, inclusive, $R_3$ is either

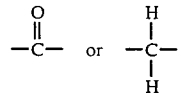

x and y each have independently an average value between about one and about 20 inclusive;

from about 20 to 60 weight percent of at least one nonionic block ethoxylate propoxylate compound of the formula:

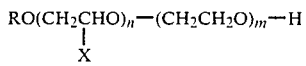

wherein:
R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

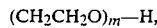

X is selected from the group consisting of methyl and hydrogen,
n is a positive whole number ranging from about 10 to 70,
m is an independently selected positive whole number of from about 15 to 190 and the sum of m plus n is a number in the range from about 25 to 200 in any given molecule; and
from about 0 to 40 weight percent of at least one polyol compound of the formula:

HO—R$^1$—OH wherein:
R$^1$ is a divalent radical selected from the group consisting of:
(a) alkylene radicals each containing from 2 through 6 carbon atoms,
(b) alkoxylalkylene radicals each containing one oxygen atom and from 3 through 7 carbon atoms, (c) radicals of the formula:

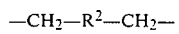

R$^2$ is a radical selected from the group consisting of:

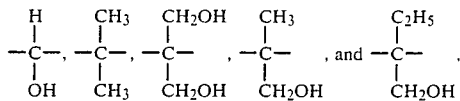

and
(d) radicals of the formula:

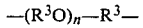

R$^3$ is an alkylene radical containing from 2 through 4 carbon atoms and
n is an integer of from 2 through 6.

17. A compatibility agent for polyol blends containing fluorocarbon blowing agent and aromatic polyester polyol comprising in combination on a 100 weight percent total weight basis
from about 30 to 80 weight percent of at least 1 diol compound selected from the group consisting of ethoxylated cocoamides and ethoxylated cocoamines each containing from about 5 to 15 moles of combined ethylene oxide per molecule;
from about 20 to 70 weight percent of an ethoxylate propoxylate of nonyl phenol containing about 35 moles of combined porpylene oxide and about 65 moles of combined ethylene oxide; and
from about 0 to 40 weight percent of diethylene glycol.

* * * * *